United States Patent
Siemionow et al.

(10) Patent No.: US 12,067,675 B2
(45) Date of Patent: Aug. 20, 2024

(54) AUTONOMOUS RECONSTRUCTION OF VESSELS ON COMPUTED TOMOGRAPHY IMAGES

(71) Applicant: Kardiolytics Inc., Tulsa, OK (US)

(72) Inventors: Kris Siemionow, Chicago, IL (US);
Paul Lewicki, Tulsa, OK (US); Marek Kraft, Poznan (PL); Dominik Pieczynski, Tulce (PL); Michal Mikolajczak, Poznan (PL); Jacek Kania, Rogozno (PL)

(73) Assignee: KARDIOLYTICS INC., Tulsa, OK (US)

(*) Notice: Subject to any disclaimer, the term of this patent is extended or adjusted under 35 U.S.C. 154(b) by 0 days.

(21) Appl. No.: 17/705,336

(22) Filed: Mar. 27, 2022

(65) Prior Publication Data
US 2022/0335687 A1 Oct. 20, 2022

(30) Foreign Application Priority Data
Mar. 4, 2021 (EP) .................................... 21160817

(51) Int. Cl.
*G06T 17/00* (2006.01)
*G06T 19/20* (2011.01)

(52) U.S. Cl.
CPC .............. *G06T 17/00* (2013.01); *G06T 19/20* (2013.01); *G06T 2210/41* (2013.01); *G06T 2219/2004* (2013.01)

(58) Field of Classification Search
None
See application file for complete search history.

(56) References Cited

U.S. PATENT DOCUMENTS

| 10,699,407 | B2 | 6/2020 | Isgum et al. | |
| 2016/0019270 | A1* | 1/2016 | Jones | G05B 19/4097 700/98 |
| 2020/0151507 | A1 | 5/2020 | Siemionow et al. | |
| 2020/0410687 | A1* | 12/2020 | Siemionow | A61B 34/10 |
| 2021/0327126 | A1* | 10/2021 | Hu | G06V 10/82 |

FOREIGN PATENT DOCUMENTS

EP 3726460 A1 10/2020

* cited by examiner

*Primary Examiner* — Kee M Tung
*Assistant Examiner* — Jed-Justin Imperial
(74) *Attorney, Agent, or Firm* — Rivka Friedman

(57) ABSTRACT

A computer-implemented method for autonomous reconstruction of vessels on computed tomography images, includes: providing a reconstruction convolutional neural network (CNN); receiving an input 3D model of a vessel to be reconstructed; defining a region of interest (ROI) and a movement step, wherein the ROI is a 3D volume that covers an area to be processed; defining a starting position and positioning the ROI at the starting position; reconstructing a shape of the input 3D model within the ROI by inputting the fragment of the input 3D model within the ROI to the reconstruction convolutional neural network (CNN) and receiving the reconstructed 3D model fragment; moving the ROI by the movement step along a scanning path; repeating the reconstruction and moving steps to reconstruct a desired portion of the input 3D model at consecutive ROI positions; and combining the reconstructed 3D model fragments.

7 Claims, 6 Drawing Sheets

AUTONOMOUS RECONSTRUCTION OF VESSELS ON COMPUTED TOMOGRAPHY IMAGES

TECHNICAL FIELD

The present disclosure generally relates to autonomous reconstruction of blood vessels on computed tomography images, useful in particular for the field of computer assisted diagnosis, treatment, and monitoring of vessel diseases.

BACKGROUND

Specialized computer systems can be used to process the CT images to develop three-dimensional models of the anatomy fragments. For this purpose, various machine learning technologies are developed, such as a convolutional neural network (CNN) that is a class of deep, feed-forward artificial neural networks. CNNs use a variation of feature detectors and/or multilayer perceptrons designed to require minimal preprocessing of input data.

There are known methods and systems, such as described in EP3726460, that can detect and segment coronary artery vessels on the CT images.

There are also known methods and systems, such as described in EP3629341, for modelling blood vessels, that compare an actual model of blood vessels which may contain lesions with a reference model that reflects a state of healthy blood vessels that lack lesions, and perform numerical simulation to calculate parameters that may indicate the course of a disease and therapeutics actions that could be taken. So far, the reference model could be generated manually, which was a time-consuming and error-prone task.

SUMMARY OF THE INVENTION

Certain embodiments presented herein relate to machine learning based reconstruction of vascular structures in medical images, and more particularly, to machine learning based reconstruction of blood vessels in computed tomography (CT) images. Automatic reconstruction of contrast filled coronary arteries CT scans facilitates the diagnosis, treatment, and monitoring of vessel diseases.

Applicant has recognized a need for an autonomous method system that could reconstruct an original model of blood vessels containing stenoses to a reference model without stenoses such that the reconstructed model can be used e.g. to perform comparative computations of blood flow.

In one aspect, there is disclosed a computer-implemented method for autonomous reconstruction of vessels on computed tomography images, the method comprising: providing a reconstruction convolutional neural network that is pre-trained with a plurality of batches of training data comprising known 3D models of vessel and their reconstructed 3D models, in order to generate a reconstructed 3D model fragment based on an input 3D model fragment; receiving an input 3D model of a vessel to be reconstructed; defining a region of interest and a movement step, wherein the ROI is a 3D volume that covers an area to be processed; defining a starting position and positioning the ROI at the starting position; reconstructing a shape of the input 3D model within the ROI by inputting the fragment of the input 3D model within the ROI to the reconstruction convolutional neural network and receiving the reconstructed 3D model fragment; moving the ROI by the movement step along a scanning path; repeating the reconstruction and moving steps to reconstruct a desired portion of the input 3D model at consecutive ROI positions; combining the reconstructed 3D model fragments from the consecutive ROI positions to obtain a reconstructed 3D model of the vessel.

The batches of training data may comprise known 3D models of vessel and their reconstructed 3D models are split into fragments of different sizes to train the reconstruction convolutional neural network with different ROI box sizes.

The fragments of the known 3D models of vessel and their reconstructed 3D models of the training data may overlap.

The method may further comprise comparing the reconstructed 3D model fragment with the input 3D model fragment to determine a difference between the reconstructed 3D model fragment and the input 3D model fragment.

If the difference exceeds a threshold, the movement step may be decreased.

If the difference can be measured as difference between the volume of the reconstructed 3D model fragment and the input 3D model fragment.

The scanning path can be defined along an axis of the vessel that is scanned.

Upon combining the reconstructed 3D model fragments, if the reconstructed 3D model fragments overlap, an average of the overlapping reconstructed 3D model fragments may be calculated to obtain the reconstructed 3D model shape.

In another aspect, there is disclosed a computer-implemented system, comprising: at least one nontransitory processor-readable storage medium that stores at least one of processor-executable instructions or data; and at least one processor communicably coupled to at least one nontransitory processor-readable storage medium, wherein at least one processor is configured to perform the steps of the method in accordance with any embodiments described above.

These and other features, aspects and advantages of the invention will become better understood with reference to the following drawings, descriptions and claims.

BRIEF DESCRIPTION OF DRAWINGS

Various embodiments are herein described, by way of example only, with reference to the accompanying drawings, wherein.

DETAILED DESCRIPTION OF THE EMBODIMENTS

The following detailed description is of the best currently contemplated modes of carrying out the invention. The description is not to be taken in a limiting sense, but is made merely for the purpose of illustrating the general principles of the invention.

The following embodiment will be presented with respect to coronary artery vessels. However, the invention is also applicable to reconstruction of other types of vessels that may contain stenosis, such as brain vessels, lung, kidney, or peripheral blood vessels.

Figure 1:
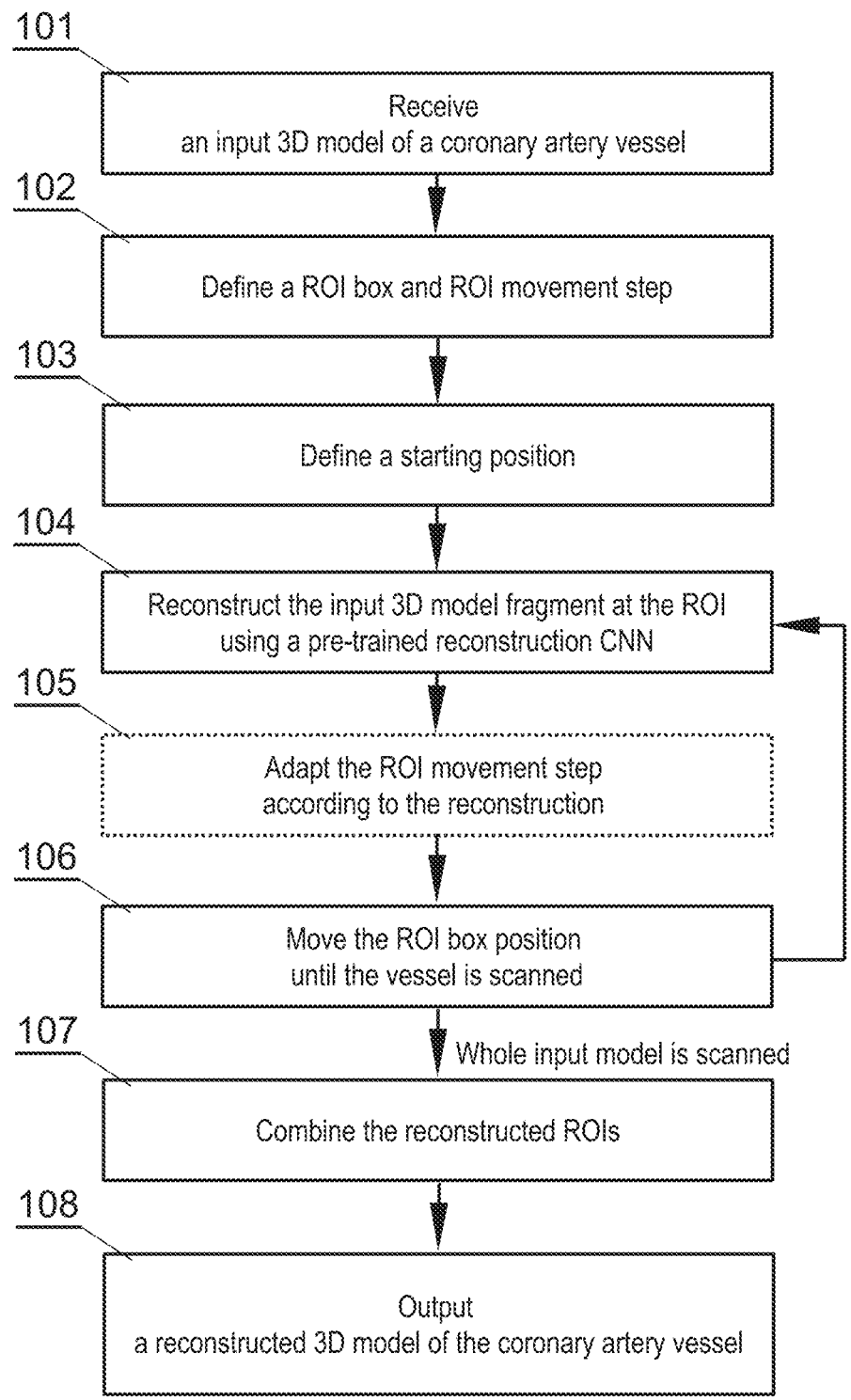
FIG. 1 shows a procedure for reconstruction of the artery vessels.

The reconstruction method is presented in details in FIG. 1.

Figure 2A:
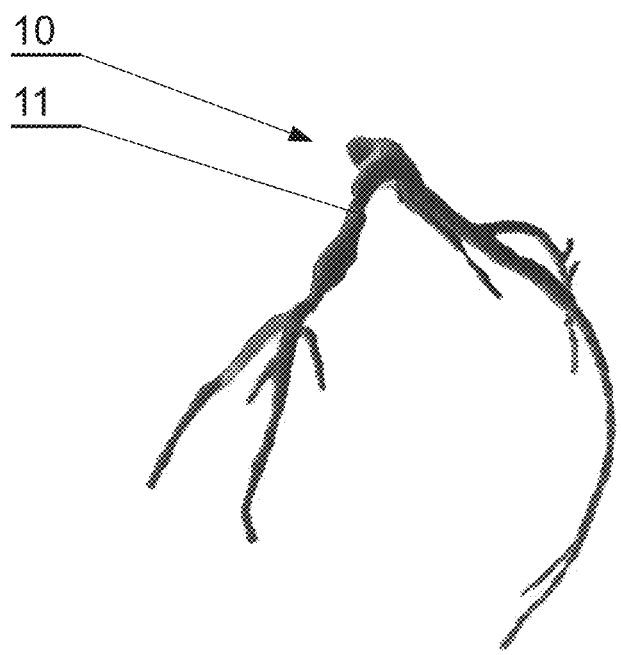
FIG. 2A shows an example of an input 3D model of a coronary artery vessel.

In step 101, an input three-dimensional (3D) model of a coronary artery vessel 10 is received, such as shown in FIG. 2A. For example, this can be a 3D model segmented from a computed tomography (CT) volumetric scan, as described in EP3629341. A stenosis 11 may be present in the vessel 10.

In step 102, a region of interest (ROI) box is defined and its movement step. The ROI box is a 3D volume (preferably, a cube) that covers an area to be processed. For example, the ROI may have a size of 64×64×64 voxels, each having the size of for example 0.5×0.5×0.5 mm or 0.4×0.4×0.65 mm. The initial ROI movement step is preferably smaller than the ROI size, such that consecutive ROI positions overlap, for example it can be defined as a half of the ROI cube side length, if the ROI has a shape of a cube.

In step 103, a starting position for the ROI box is defined. For example, this can be the right or left coronary artery entry.

Figure 3A:
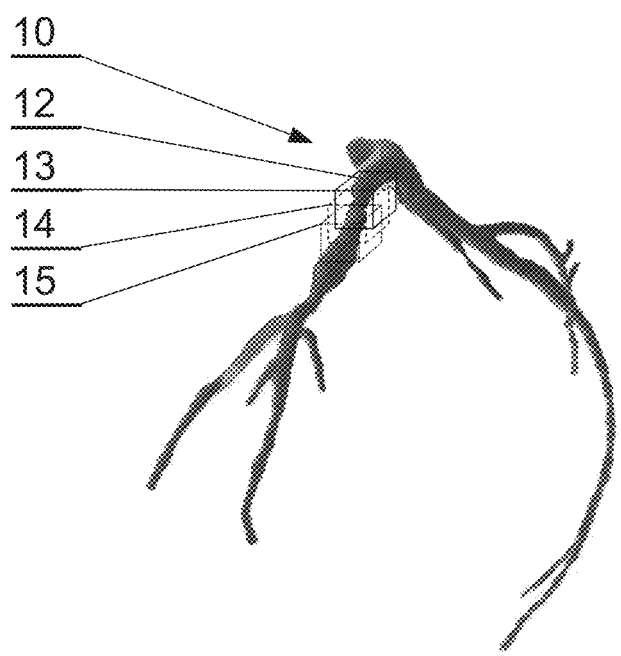
FIG. 3A shows an example of the input 3D model with consecutive positions of ROI boxes.
Figure 3B:
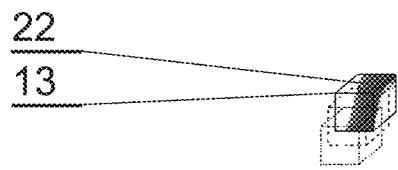
FIG. 3B shows an example of a reconstructed 3D fragment.

Next, in step 104, as shown with reference to FIGS. 3A and 3B, an input 3D model fragment 12 that is within the ROI box 13 is input to a pre-trained reconstruction convolutional neural network (CNN) 400, to obtain a reconstructed 3D model fragment 22.

In step 105, the reconstructed 3D model fragment 22 may be compared with the input 3D model fragment 12 to determine whether there were any modifications introduced by the reconstruction CNN 400. If the differences between the fragments 22 and 12 are above a certain threshold, for example the volume of the reconstructed 3D model fragment 22 is 10% higher than the volume of the input 3D model fragment 12, then it may indicate that there is a stenosis at the currently processed fragment and the processing shall be performed with a greater accuracy. In that case, the ROI movement step may be decreased, for example by 50%, or by an amount proportional to the detected difference. If there is a small difference, then the initial value of the ROI movement step may be applied as defined in step 102.

In step 106, the ROI box position is moved by the ROI movement step along a scanning path. The scanning path may be defined along an axis of the vessel that is currently scanned. In case there is an intersection of vessels, the scanning may be performed along one vessel until its end and next may return to the intersection and continue along the other vessel. The procedure continues back to step 104 to reconstruct a desired portion of the input 3D model (or the whole model) at consecutive ROI positions 14, 15.

Figure 2B:
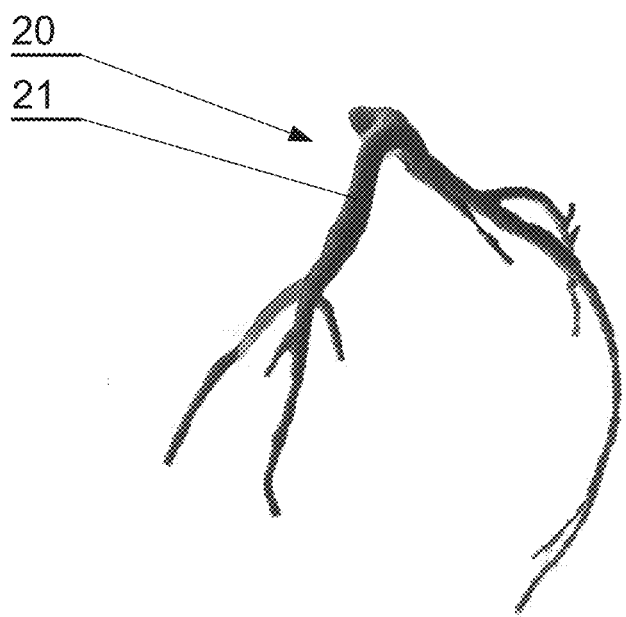
FIG. 2B shows an example of a reconstructed 3D model of a coronary artery vessel.

In step 107, the reconstructed 3D model fragments 22 from consecutive ROI positions are combined to a reconstructed 3D model of the coronary artery vessel 20, as shown in FIG. 2B. If the 3D model fragments overlap, an average of the overlapping fragments can be calculated to obtain the reconstructed 3D model shape. In the reconstructed 3D model, it is each vessel fragment with a stenosis 11 shall be reconstructed to its healthy shape 21.

The reconstructed 3D model of the coronary artery vessel 20 is output in step 108.

Figure 4:
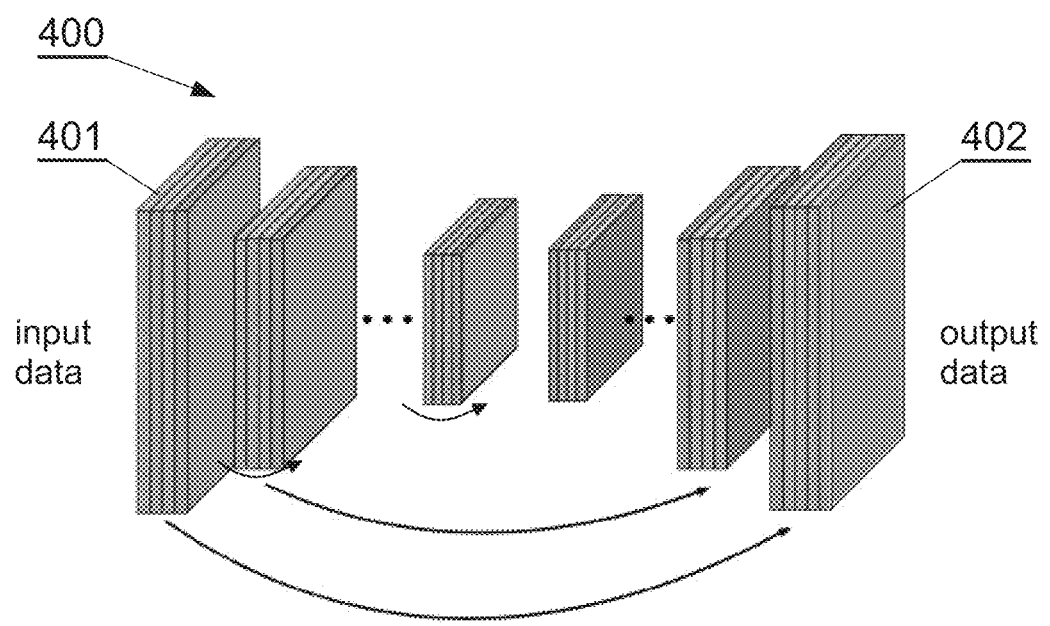
FIG. 4 shows a schematic representation of a reconstruction CNN.

A schematic representation of the reconstruction CNN 400 is shown in FIG. 4. The input data represents an input 3D model fragment. The left side of the network is an encoder 401, which is a convolutional neural network, and the right side is a decoder 402. The encoder 401 may include a number of convolutional layers and a number of pooling layers, each pooling layer preceded by at least one convolutional layer. The encoder might be either pretrained, or trained from random initialisation. The decoder 402 path may include a number of convolutional layers and a number of upsampling layers, each upsampling layer preceded by at least one convolutional layer, and may include a transpose convolution operation which performs upsampling and interpolation with a learned kernel. The network may include a number of residual connections bypassing groups of layers in both the encoder and the decoder.

The residual connections may be either unit residual connections, or residual connections with trainable parameters. The residual connections can bypass one or more layers. Furthermore, there can be more than one residual connection in a section of the network. The network may include a number of skip connections connecting the encoder and the decoder section. The skip connections may be either unit connections or connections with trainable parameters. Skip connections improve the performance through information merging enabling the use of information from the encoder stages to train the deconvolution filters to upsample. The number of layers and number of filters within a layer is also subject to change, depending on the requirements of the application. The final layer for reconstruction outputs a reconstructed 3D fragment.

The convolution layers can be of a standard kind, the dilated kind, or a combination thereof, with ReLU, leaky ReLU, Swish or Mish activation attached.

The upsampling or deconvolution layers can be of a standard kind, the dilated kind, or a combination thereof, with ReLU, leaky ReLU, Swish or Mish activation attached.

The reconstruction CNN adjusts its internal parameters, which include the weights in the internal convolutional layers of the dimensions W×H, which denotes the width and height, respectively, with W and H being positive integers and the weights of the additional fully connected layers. During training, the network may repeatedly perform the following steps:

1. the step of prediction of the reconstructed 3D fragment based on the input 3D fragment,
2. the computation of the difference between the input 3D fragment (as given in the training data) and the reconstructed 3D fragment with the difference computed as dice loss, cross-entropy loss, Tversky loss, . . . ;
3. The update of weights according to the gradient back-propagation method based on the steepest descent gradient algorithm or one of its variants (Adam, Nadam, adagrad, . . . )

Doing so, the network adjusts its parameters and improves its predictions over time. During training, the following means of improving the training accuracy can be used:

- learning rate scheduling (fixed, cyclic learning rate changes, cosine annealing, . . . )
- early stopping
- regularization by dropout
- L2 regularization, batch normalization, group normalization
- data augmentation (by random rotations, intensity changes, noise introduction, affine and elastic transformations etc.)

The training process may include periodic check of the prediction accuracy using a held out input data set (the validation set) not included in the training data. If the check reveals that the accuracy on the validation set is better than the one achieved during the previous check, the complete neural network weights are stored for further use. The early stopping function may terminate the training if there is no improvement observed during the last CH checks. Otherwise, the training is terminated after a predefined number of steps S.

Figure 5:
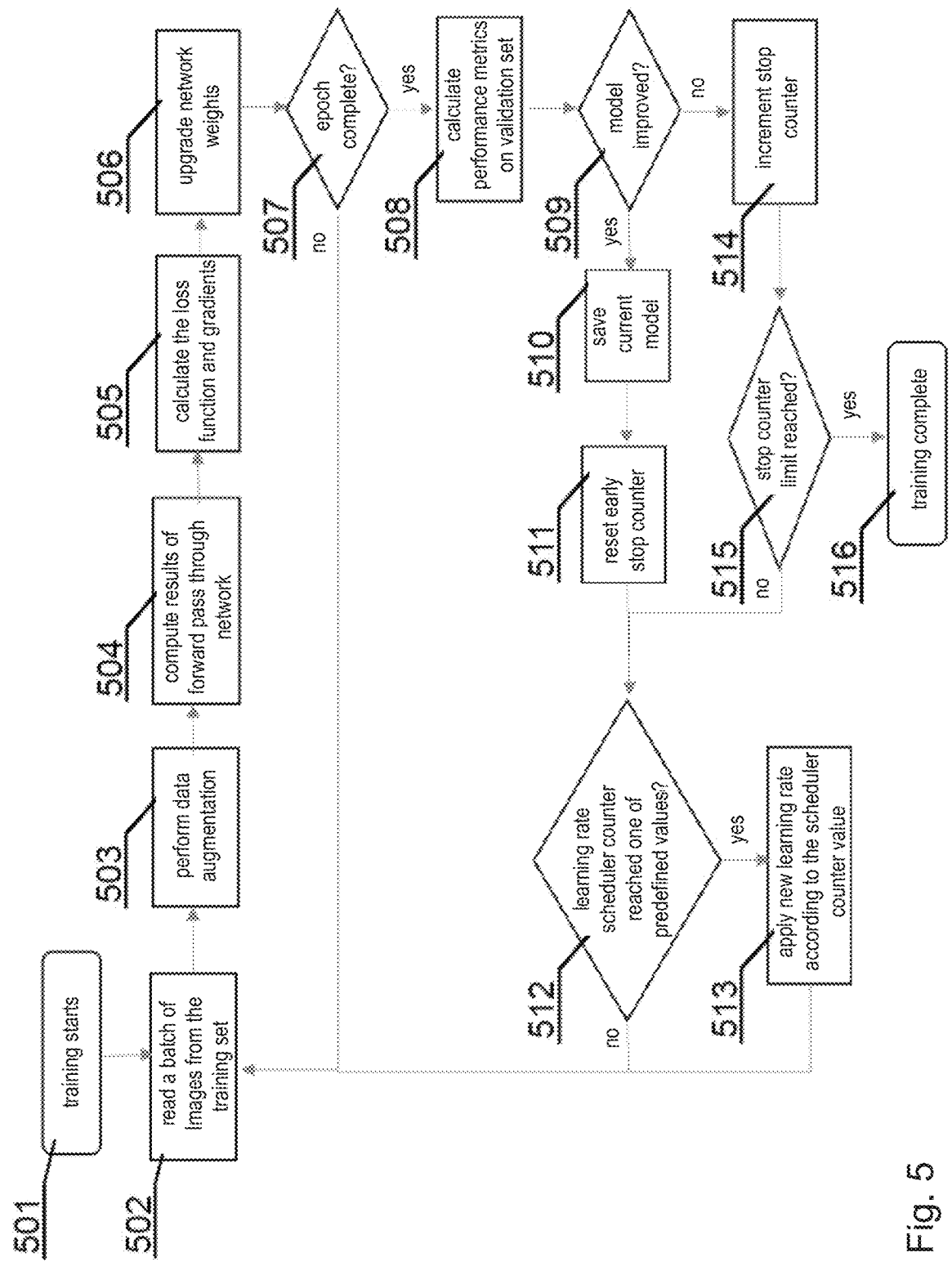
FIG. 5 shows an outline of a training procedure for the reconstruction CNN.

The training procedure may be performed according to the outline shown in FIG. 5. The training starts at 501. At 502, batches of training images are read from the training set, one batch at a time.

The batches of training images are prepared based on known 3D models of coronary artery vessels and their reconstructed 3D models, for example reconstructed manually by doctors. These 3D models may be split into fragments of different sizes, to allow the network to be trained with different ROI box sizes. The fragments may overlap and the step between the fragments may be small, in order to train the network with high amount of data.

At 503 the images can be augmented. Data augmentation is performed on these images to make the training set more diverse. The input/output image pair is subjected to the same combination of transformations from the following set: rotation, scaling, movement, horizontal flip, additive noise of Gaussian and/or Poisson distribution and Gaussian blur, elastic transform, brightness shift, contrast/gamma changes, grid/optical distortion, batch-level samples averaging, random dropout, etc.

At 504, the images and generated augmented images are then passed through the layers of the CNN in a standard forward pass. The forward pass returns the results, which are then used to calculate at 505 the value of the loss function—the difference between the desired output and the actual, computed output. The difference can be expressed using a similarity metric, e.g.: mean squared error, mean average error, categorical cross-entropy or another metric.

At 506, weights are updated as per the specified optimizer and optimizer learning rate. The loss may be calculated using a per-pixel cross-entropy loss function and the Adam update rule.

The loss is also back-propagated through the network, and the gradients are computed. Based on the gradient values, the network's weights are updated. The process (beginning with the image batch read) is repeated continuously until an end of the training session is reached at 507.

Then, at 508, the performance metrics are calculated using a validation dataset—which is not explicitly used in training set. This is done in order to check at 509 whether not the model has improved. If it isn't the case, the early stop counter is incremented at 514 and it is checked at 515 if its value has reached a predefined number of epochs. If so, then the training process is complete at 516, since the model hasn't improved for many sessions now, so it can be concluded that the network started overfitting to the training data.

If the model has improved, the model is saved at 510 for further use and the early stop counter is reset at 511. As the final step in a session, learning rate scheduling can be applied. The session at which the rate is to be changed are predefined. Once one of the session numbers is reached at 512, the learning rate is set to one associated with this specific session number at 513.

Once the training is complete, the network can be used for inference, i.e. utilizing a trained model for prediction on new input data.

Upon the completion of the training, the weights of the neural network are stored and can be used for prediction.

Figure 6:
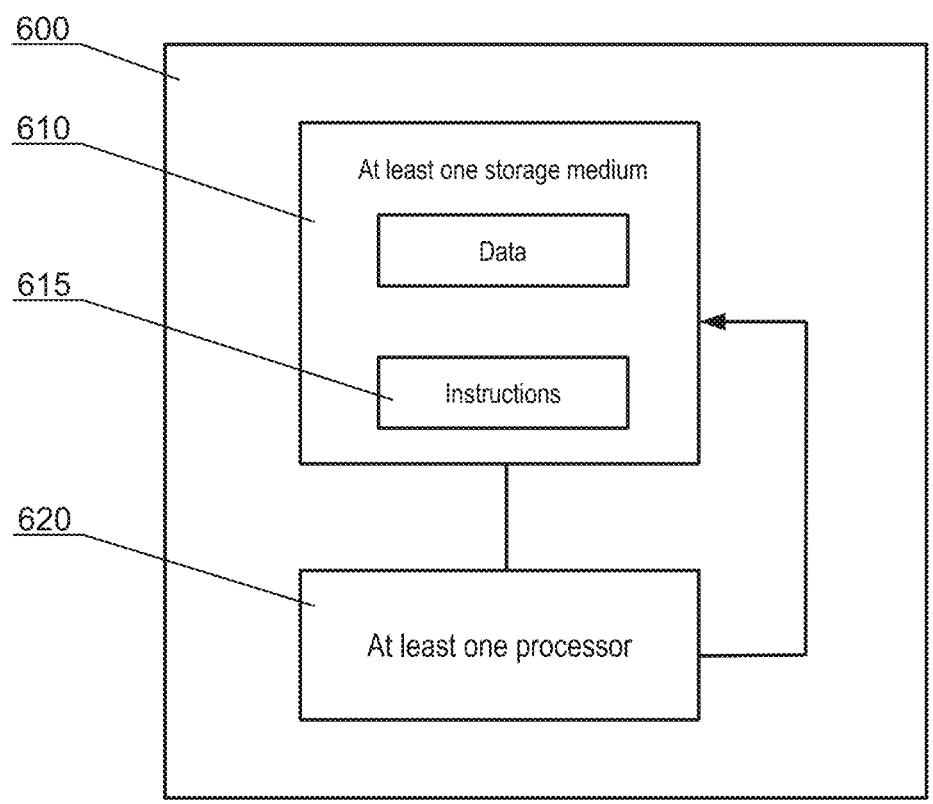
FIG. 6 shows the structure of a computer system for implementing the method of FIG. 1.

The functionality described herein can be implemented in a computer system 700, such as shown in FIG. 6. The system 600 may include at least one nontransitory processor-readable storage medium 610 that stores at least one of processor-executable instructions 615 or data; and at least one processor 620 communicably coupled to the at least one nontransitory processor-readable storage medium 610. The at least one processor 620 may be configured to (by executing the instructions 615) perform the procedure of FIG. 1.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A computer-implemented method for autonomous reconstruction of vessels on computed tomography images, the method comprising:
   providing a reconstruction convolutional neural network (CNN) that is pre-trained with a plurality of batches of training data comprising known 3D models of vessel and their reconstructed 3D models, in order to generate a reconstructed 3D model fragment based on an input 3D model fragment;
   receiving an input 3D model of a vessel to be reconstructed;
   defining a region of interest (ROI) and a movement step, wherein the ROI is a 3D volume that covers an area to be processed;
   defining a starting position and positioning the ROI at the starting position;
   reconstructing a shape of the input 3D model within the ROI by inputting the fragment of the input 3D model within the ROI to the reconstruction convolutional neural network (CNN) and receiving the reconstructed 3D model fragment;
   moving the ROI by the movement step along a scanning path;
   repeating the reconstruction and moving steps to reconstruct a desired portion of the input 3D model at consecutive ROI positions;
   combining the reconstructed 3D model fragments from the consecutive ROI positions to obtain a reconstructed 3D model of the vessel; and
   comparing the reconstructed 3D model fragment with the input 3D model fragment to determine a difference between the reconstructed 3D model fragment and the input 3D model fragment, wherein if the difference exceeds a threshold, the movement step is decreased.

2. The method according to claim 1, wherein the batches of training data comprising known 3D models of vessel and their reconstructed 3D models are split into fragments of different sizes to train the reconstruction convolutional neural network with different ROI box sizes.

3. The method according to claim 2, wherein the fragments of the known 3D models of vessel and their reconstructed 3D models of the training data overlap.

4. The method according to claim 1, wherein if the difference is measured as difference between the volume of the reconstructed 3D model fragment and the input 3D model fragment.

5. The method according to claim 1, wherein the scanning path is defined along an axis of the vessel that is scanned.

6. The method according to claim 1, wherein upon combining the reconstructed 3D model fragments, if the reconstructed 3D model fragments overlap, an average of the overlapping reconstructed 3D model fragments is calculated to obtain the reconstructed 3D model shape.

7. A computer-implemented system, comprising:
- at least one nontransitory processor-readable storage medium that stores at least one of processor-executable instructions or data; and
- at least one processor communicably coupled to at least one nontransitory processor-readable storage medium, wherein at least one processor is configured to perform the steps of:
- providing a reconstruction convolutional neural network (CNN) that is pre-trained with a plurality of batches of training data comprising known 3D models of vessel and their reconstructed 3D models, in order to generate a reconstructed 3D model fragment based on an input 3D model fragment;
- receiving an input 3D model of a vessel to be reconstructed;
- defining a region of interest (ROI) and a movement step, wherein the ROI is a 3D volume that covers an area to be processed;
- defining a starting position and positioning the ROI at the starting position;
- reconstructing a shape of the input 3D model within the ROI by inputting the fragment of the input 3D model within the ROI to the reconstruction convolutional neural network (CNN) and receiving the reconstructed 3D model fragment;
- moving the ROI by the movement step along a scanning path;
- repeating the reconstruction and moving steps to reconstruct a desired portion of the input 3D model at consecutive ROI positions;
- combining the reconstructed 3D model fragments from the consecutive ROI positions to obtain a reconstructed 3D model of the vessel; and
- comparing the reconstructed 3D model fragment with the input 3D model fragment to determine a difference between the reconstructed 3D model fragment and the input 3D model fragment, wherein if the difference exceeds a threshold, the movement step is decreased.

* * * * *